United States Patent Office 3,138,065
Patented June 23, 1964

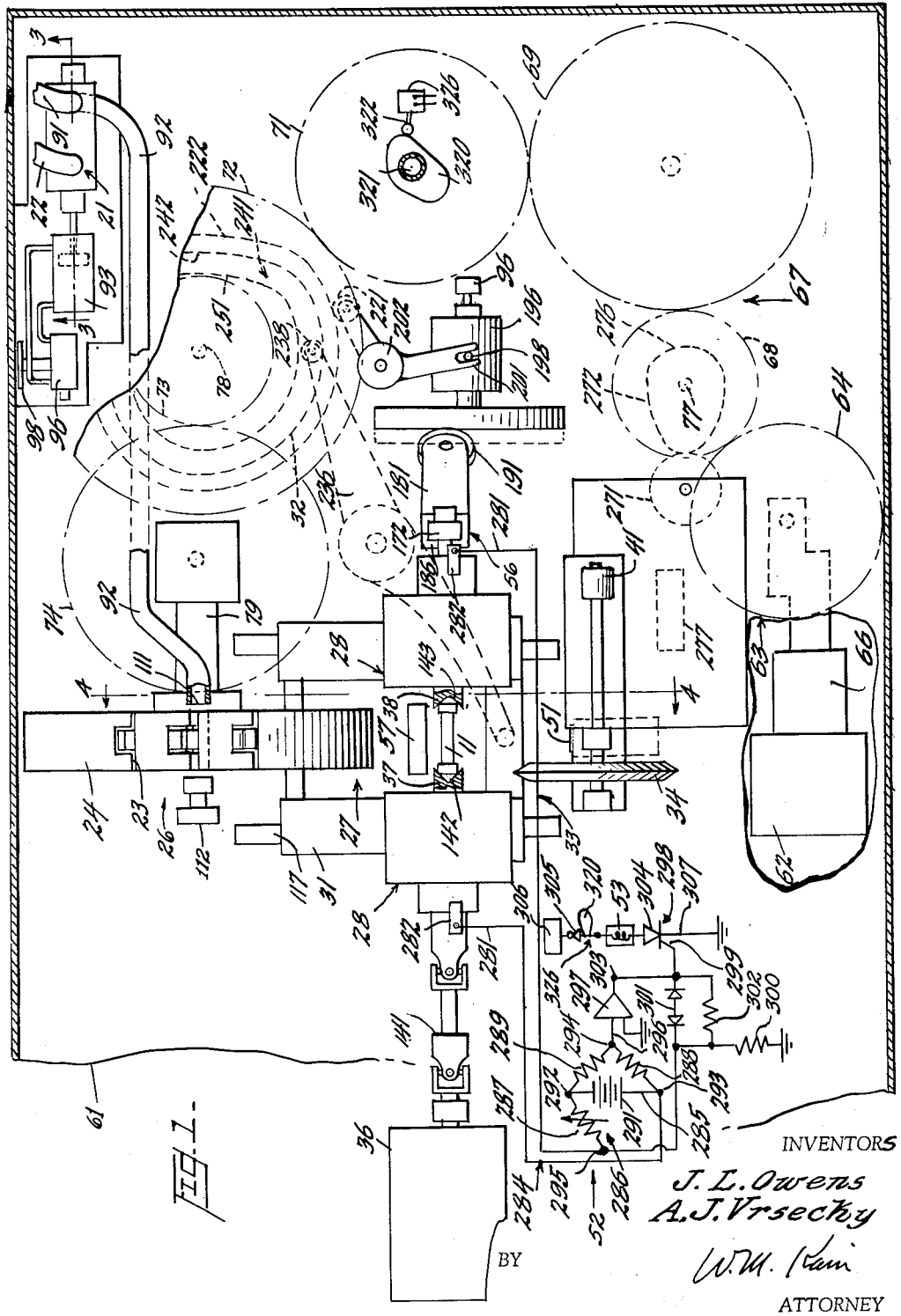

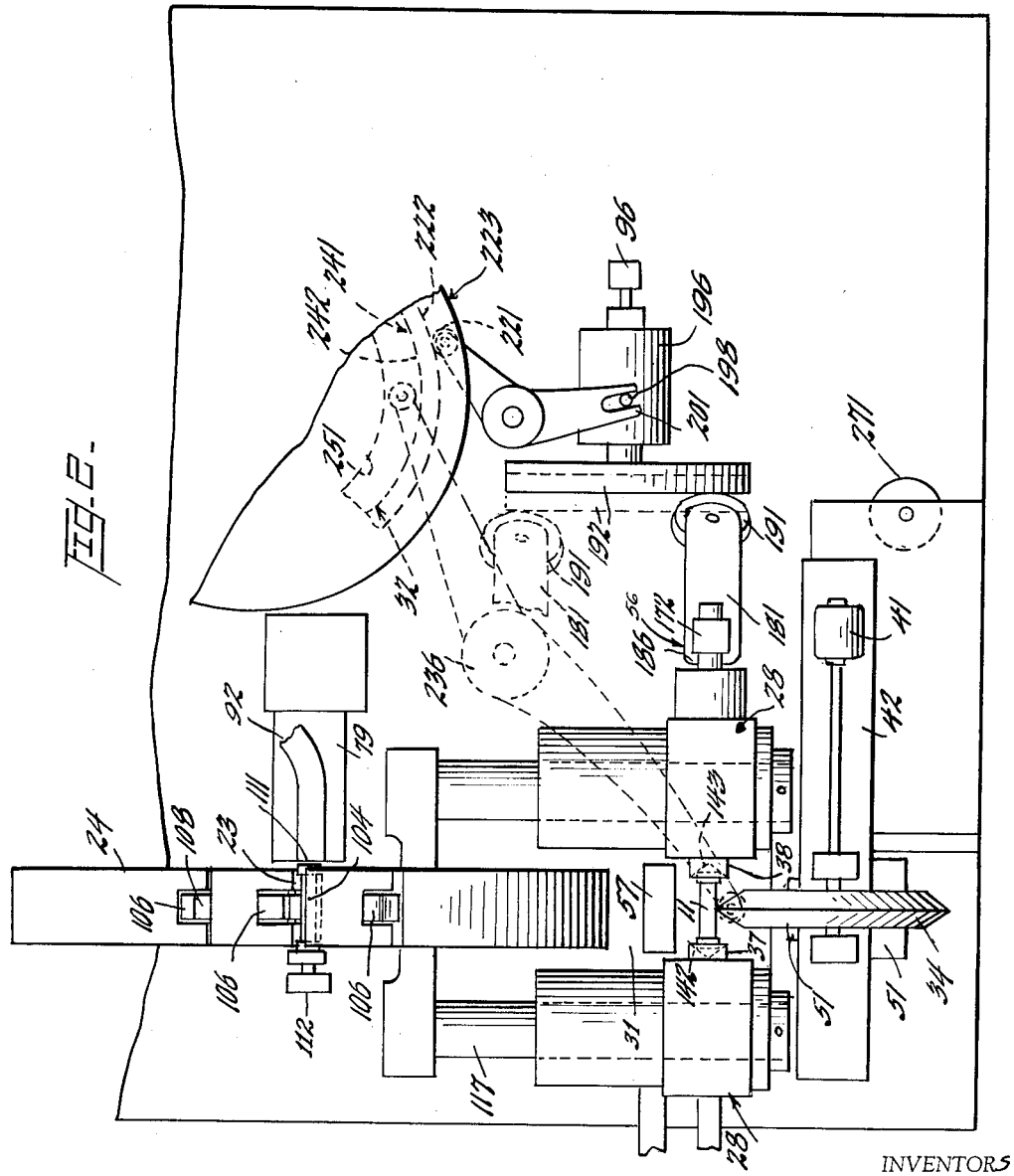

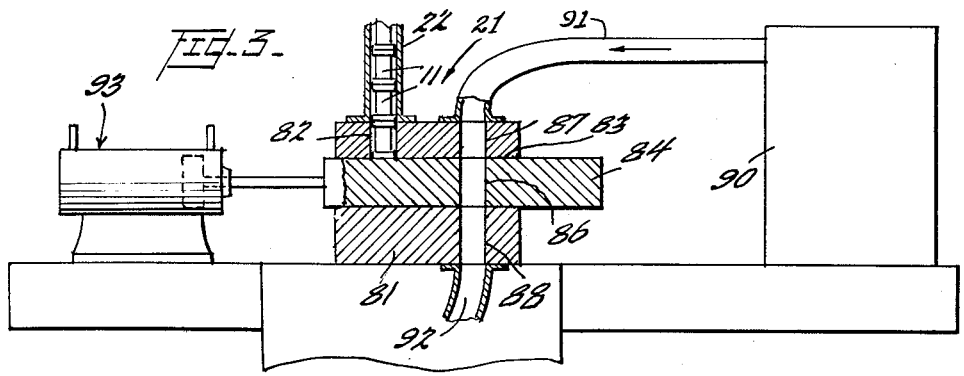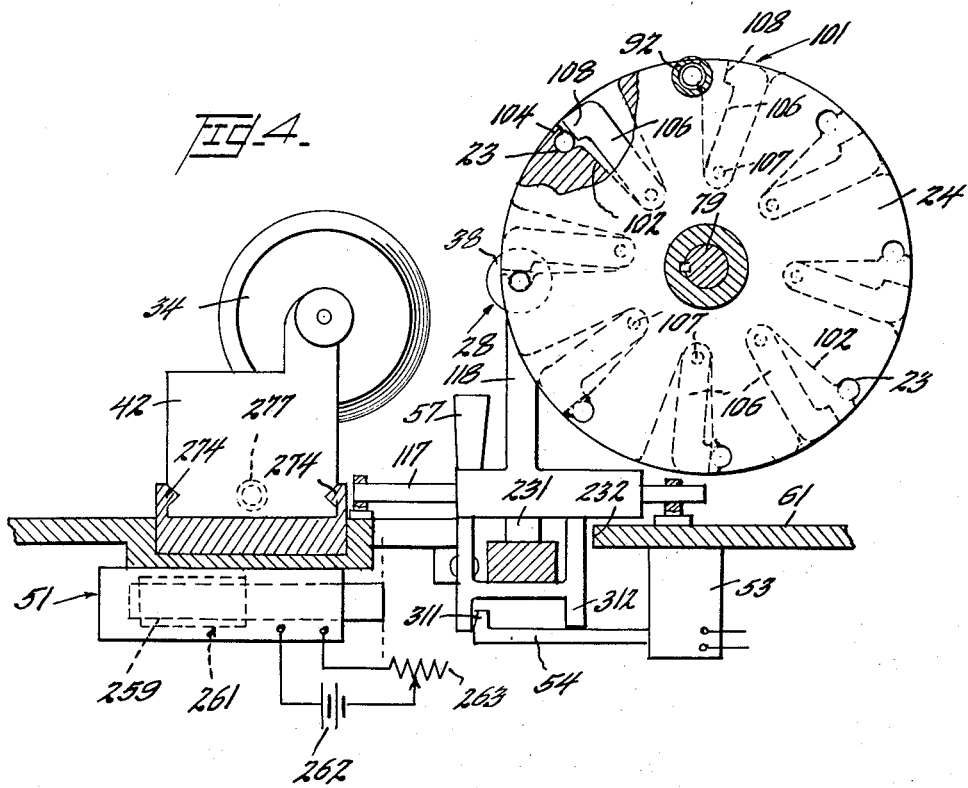

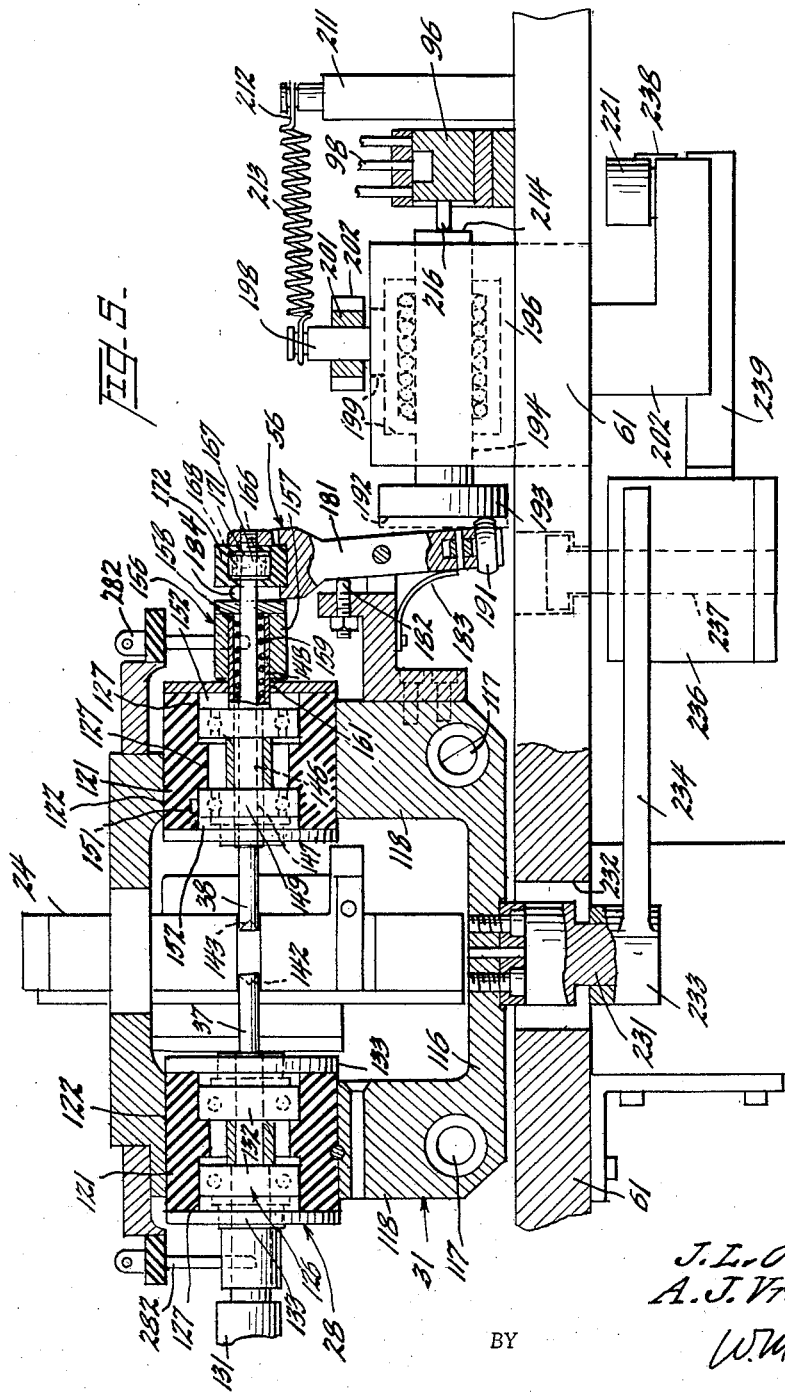

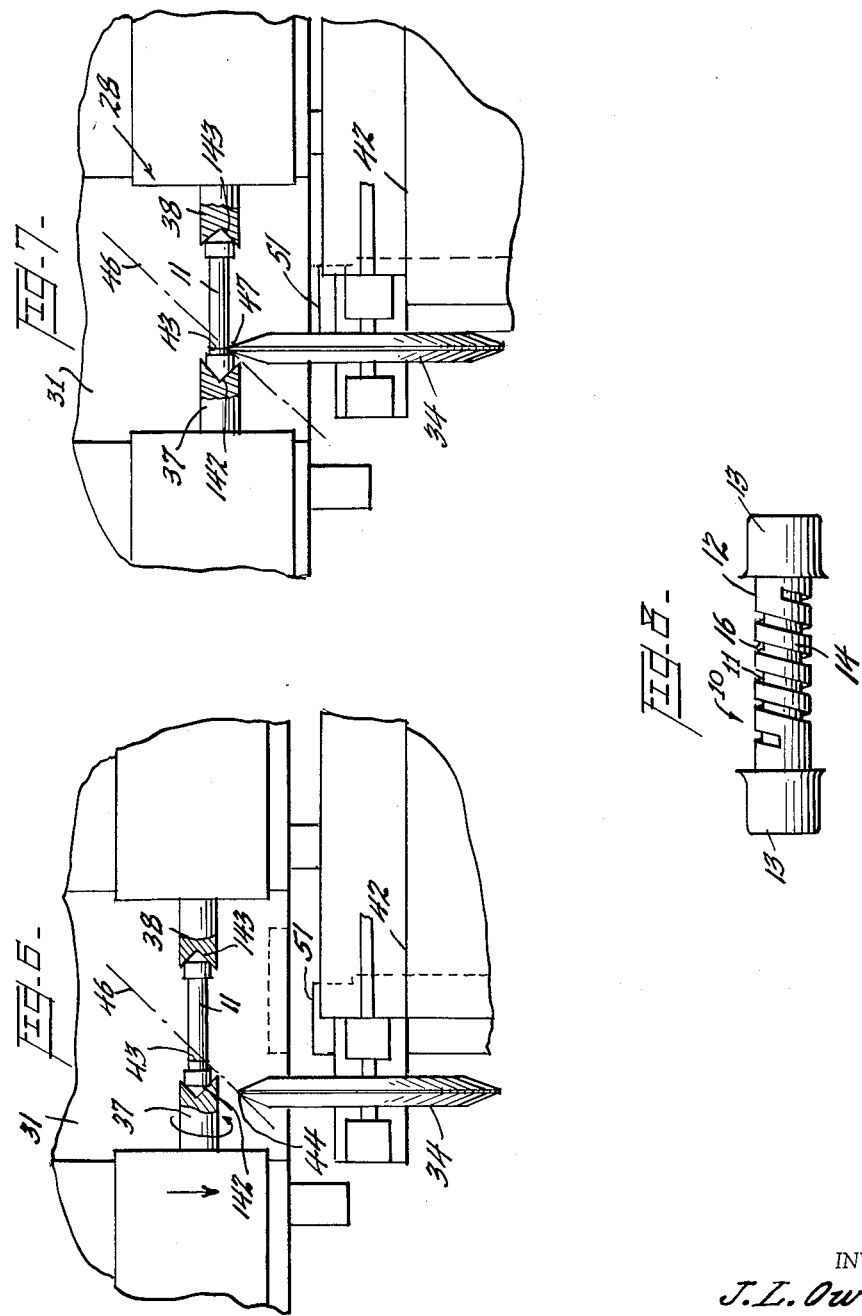

3,138,065
APPARATUS FOR MACHINING SELECTED AREAS OF THE SURFACE OF AN ARTICLE
James L. Owens, Clemmons, and Anthony J. Vrsecky, Winston-Salem, N.C., assignors to Western Electric Company, Incorporated, New York, N.Y., a corporation of New York
Filed June 25, 1962, Ser. No. 204,990
2 Claims. (Cl. 90—11.64)

This invention relates to an apparatus for machining selected areas of the surface of an article and more particularly to an apparatus for removing a spiral groove from a carbon coating deposited on a ceramic resistor core.

In manufacturing operations, it is sometimes necessary to machine the surface of an article. More particularly, in operations for manufacturing articles such as deposited carbon resistors, a spiral groove is machined through an electrically conductive carbon coating that is deposited on the surface of a cylindrical ceramic resistor core. The spiral groove transforms the conductive coating into a continuous helical circuit path having a resistance that may be selected and controlled with accuracy by adjusting the lead angle or pitch by which the spiral groove is machined in the coating.

During the operation for manufacturing the deposited carbon resistors, the carbon coated ceramic resistor core is rotated on its axis at a preselected speed and advanced in a direction that is transverse to the axis of rotation. The advancing core engages a machining facility such as a cutting wheel, that is traversed parallel to the axis of the core. The machining facility removes the spiral groove of carbon coating and forms the helical circuit path having a predetermined resistance.

Research indicates that the accuracy with which the resistance is selected and controlled depends upon maintenance of a predetermined interrelation among (1) the speed of rotation of the resistor core, (2) the rate of traverse of the groove machining facility relative to the rotating resistor core, and (3) the timing of the advancement of the rotating resistor core into and out of engagement with the traversing machining facility.

An object of the present invention is to provide a new and improved apparatus for machining selected areas of the surface of an article.

Another object of the present invention resides in an apparatus for removing a spiral groove from a carbon coating deposited on a resistor core to form a helical circuit path having a predetermined resistance.

Still another object of the present invention is to provide a slotted cam facility for positively advancing a slide mechanism to move a rotating article into engagement with a groove machining instrumentality in conjunction with an electromagnetic device for selectively advancing the slide mechanism relative to the slotted cam facility to regulate the machined depth of the groove.

An additional object of the present invention resides in the provision of a unitary cam facility for advancing in a first direction an article chucking mechanism provided with an instrumentality for operating the chucking mechanism wherein the instrumentality rides along an elongated control member extending in the first direction and is actuated in response to movement of the member in a direction transverse to the first direction under the action of the unitary cam facility.

A further object of the present invention resides in a common drive for continuously rotating an article supplier and for advancing an article gripper to the supplier in conjunction with elongated control facilities operated by the common drive for actuating the gripper during the advancement thereof to the supplier.

With these and other objects in view, the present invention contemplates an apparatus for transferring articles to a machining facility to remove selected areas of a coating provided on the surface of each of the articles. An article chucking mechanism is advanced by a carriage to a continuously rotating article carrier. The chucking mechanism is operated and grips an article from the carrier whereupon the carriage advances toward the machining facility to remove the gripped article from the carrier.

The chucking mechanism rotates the gripped articles as the carriage advances the article into engagement with the machining facility. An electromagnetic device regulates the engagement of the article and the facility to remove the selected areas of the coating from the article whereafter a control facility operates a release mechanism. The release mechanism overcomes the action of the electromagnetic device and advances the article out of engagement with the machining facility whereafter the carriage advances toward the carrier. As the carriage advances, the chucking mechanism releases the machined article.

A complete understanding of this invention may be had by reference to the following detailed description when read in conjunction with the accompanying drawings illustrating a preferred embodiment thereof, wherein:

FIG. 1 is a schematic plan view showing an apparatus for machining selected areas of the surface of an article constructed according to the principles of the present invention;

FIG. 2 is an enlarged plan view of the apparatus of FIG. 1 showing a carriage provided with a pair of rotating chucks for gripping and rotating an article such as a coated resistor core;

FIG. 3 is a cross-sectional view taken on line 3—3 of FIG. 1 showing a gating mechanism rendered effective when the chucks grip an article for feeding a coated resistor core to a carrier;

FIG. 4 is an elevational view taken in cross-section along line 4—4 of FIG. 2 showing the carrier advancing the coated core for reception by the rotating chucks in conjunction with a rotating machining wheel for cutting a spiral groove in the coating of the rotating core;

FIG. 5 is an elevational view taken in cross-section along line 5—5 of FIG. 2 showing a unitary cam facility for moving the carriage between the machining wheel and the carrier while sliding an elongated grip controller relative to the carriage to operate the chucks to grip a resistor core;

FIG. 6 is a schematic plan view of the first step in a helixing operation showing the rotating resistor core gripped by the chucks and advanced by the carriage toward the machining wheel in conjunction with a slide for traversing the machining wheel;

FIG. 7 is a schematic view similar to FIG. 6 showing the second step in the helixing operation wherein an electromagnetic device selectively moves the carriage relative to the unitary cam facility to advance the rotating core into controlled engagement with the traversing machining wheel to cut the spiral groove through the coating; and FIG. 8 is a view showing the coating provided on the resistor core transformed by the spiral groove into a helical resistive circuit path between a pair of terminal caps mounted on the ends of the core.

Referring in general to FIG. 8, an article that may be manufactured by an apparatus constructed according to the principles of the present invention is an electrical component such as a resistor 10 which includes a cylindrical ceramic core 11 provided with a coating 12 of electrically conductive material, such as carbon. A terminal or metal ferrule 13 is forced onto each end of the core 11 to provide an electrical connection to a helical resistive circuit path 14 formed during a helixing operation by removal of a selected area, such as a spiral groove 16, of the carbon coating from the ceramic core.

Attention is now directed to FIG. 1 wherein an apparatus for machining selected portions of the surface of the resistor cores 11 is shown in general including a gating mechanism 21 for selectively feeding carbon coated cores 11, provided with terminals 13, from a resistor core supply tube 22 to a series of notches 23 provided in a carrier 24 of an article carrier device 26. The carrier 24 is continuously rotated to advance successive cores 11 to a loading station 27. At the loading station 27, a resistor chucking mechanism 28 is actuated for gripping and removing the resistor cores 11 from the notches 23. A carriage or first slide 31 is initially actuated by a unitary cam drive 32 to advance the resistor chucking mechanism 28 in a first direction toward a machining station 33. The carriage 31 advances a core 11 gripped by the resistor chucking mechanism 28 into engagement with a machining facility such as an abrasive cutting wheel 34, that is provided at the machining station 33. A first motor 36 provided for a left chuck 37 and a right chuck 38 of the chucking mechanism 28, and a second motor 41 provided for the cutting wheel 34, respectively, rotate the chucks 37 and 38 and the cutting wheel 34 at predetermined speeds which remain constant during any one helixing operation.

As shown in FIG. 2, the cutting wheel 34 is mounted on a second or cutting wheel slide 42 for traversing movement in the direction of the axis of the gripped core 11 (see also FIGS. 6 and 7). The traversing movement is commenced as the carriage 31 approaches the cutting wheel 34 so that relative movement between a line 43 on the surface of the gripped core 11 and an edge 44 of the cutting wheel 34 occurs along a 45° path indicated by the dash line 46 shown in FIG. 6. The cutting wheel 34 and the rotating core 11 engage at a point 47 (FIG. 7) whereupon the unitary cam drive 32 ceases to advance the carriage 31. An electromagnetic device 51 is then effective to further advance the carriage 31 in the first direction to press and maintain the rotating core in engagement with the cutting wheel 34. The pressure exerted by the electromagnetic device 51 may be regulated by varying the field strength thereof to select the depth at which the groove 16 is cut in the carbon coating 12.

As the cutting wheel 34 traverses, the spiral groove 16 is cut to the selected depth through the coating 12 to form the helical resistive circuit path 14. A control circuit 52 connected electrically to the terminals 13 of the resistor core 11 monitors the resistance of the carbon coating 12 across the terminals 13 during the helixing operation. When the resistance of the helical circuit path 14 equals a predetermined value, the control circuit 52 energizes a release solenoid 53 which actuates a hooked arm 54 (shown in normal unactuated position in FIG. 4). When actuated, the hooked arm 54 advances the carriage 31 against and overcomes the force of the magnetic field of the electromagnetic device 51 to release the grooved resistor core 11 from engagement with the cutting wheel 34.

The unitary cam drive 32 then slides the carriage 31 toward the carrier 24 whereupon a grip controller 56 also actuated by the unitary cam drive 32 opens the chucks 37 and 38 to release and drop the grooved resistor 10 into a discharge chute 57. The unitary cam drive 32 then restores the carriage 31 and the grip controller 56 to their initial positions in anticipation of another helixing cycle.

Main Drive Assembly

Referring now to FIG. 1, a frame 61 of the machining apparatus is shown partially cut away to reveal a main drive motor 62 provided in a main drive assembly 63 mounted to the underside of the frame 61. A first gear 64 is rotated by a reduction gearing mechanism 66 driven by the main drive motor 62. The first gear 64 rotates a gear train 67 including meshing gears 68, 69, 71, 72, 73, and 74. The gear 68 rotates a first cam shaft 77 for operating the cutting wheel slide 42. The gear 72 rotates a second cam shaft 78 for operating the unitary cam drive 32 which actuates the carriage 31 and the grip controller 56 in a predetermined timed sequence. Additionally, the gear 74 causes rotation of a driven shaft 79 for rotating the carrier 24.

Gating Mechanism

Attention is now directed to FIG. 3 where the gating mechanism 21 is shown including a housing 81 secured to the frame 61 of the machining apparatus. The supply tube 22 feeds resistor cores 11 to a first aperture 82 machined vertically in the housing 81. The aperture 82 intersects a horizontal bore 83 provided in the housing 81 for slidably receiving a gate 84. A slot 86 formed vertically in the gate 84 receives a resistor core 11 from the first aperture 82 and upon sliding movement of the gate 84 transfers the core 11 into alignment with a second aperture 88 machined vertically through the housing 81 in intersection with the bore 83. A reservoir 90 supplies compressed air to a pneumatic feeder 91 connected to the second aperture 88 for propelling the core 11 from the slot 82 into a conveyor tube 92 that is connected to the carrier device 26.

An air cylinder assembly 93 is provided for sliding the gate 84 in the bore 83 in response to the actuation of an air valve 96 (FIGS. 1 and 5). The grip controller 56 actuates the air valve 96 upon actuation of the chucks 37 and 38 to grip a resistor core 11 received in a notch 23 of the carrier 24. The actuated air valve 96 supplies pressurized air from a reservoir 98 to the air cylinder assembly 93. The air cylinder assembly 93 actuates the gate 84 which dispenses or feeds a resistor core 11 to the carrier device 26 each time the grip controller 56 operates the chucks 37 and 38 to grip and remove a resistor core 11 from the carrier device 26.

Carrier Device

Directing attention now to FIG. 4, the carrier device 26 is shown including the carrier 24 that is keyed to the continuously rotating driven shaft 79. Core holder assemblies 101 are provided at evenly spaced intervals along the periphery of the carrier 24. It being understood that the core holder assemblies 101 are identical, a detailed description of only one of the assemblies follows.

The core holder assembly 101 includes a radially extending slot 102 provided with a notch 23 and a lip 104 interposed between the notch and the periphery of the carrier 24. A clamp lever 106 is pivotally mounted at the base of the slot on a pivot pin 107. The clamp lever 106 is free to pivot within the slot 102 into a core release position against one wall of the slot and into a core holding position wherein an extending section 108 of the lever 106 urges a resistor core 11 into the notch 23.

With the clamp lever 106 in the release position, the driven shaft 79 rotates the carrier counterclockwise to align the core holder assembly 101 with a terminal end 111 (FIGS. 1 and 2) of the conveyor tube 92 simultaneously with the dispensing of a resistor core 11 by the gate 84. The core 11 emerges from the terminal end 111 into the notch 23 whereupon a bumper 112 (FIGS. 1 and 2) mounted on the other side of the carrier 24 arrests the advancement of the dispensed resistor core 11. As the carrier 24 rotates further counterclockwise, the clamp lever 106 pivots under the action of gravity into the holding position to clamp the resistor core 11 in the notch 23. The carrier 24 continues to rotate counterclockwise and aligns the clamped resistor core 11 with the loading station 27 whereupon the chucking mechanism 28 is effective to grip and remove the dispensed core 11 from the notch 23.

Chucking Mechanism

Referring to FIGS. 2, 4, and 5, a base 116 (FIG. 5)

of the carriage 31 is shown slidably mounted on a pair of guide rods 117 for movement in a first direction between the loading and machining stations 27 and 33, respectively. The chucking mechanism 28 is mounted on the carriage 31 and includes two spaced arms 118 (FIG. 5) extending upwardly from the base 116 of the carriage 31. A rigid insulating sleeve 121 is mounted in a cylindrical bore 122 provided in each of the spaced arms 118. The sleeve 121 insulates the carriage 31 from a bearing assembly 126 mounted in a stepped aperture 127 machined in the sleeve 121. A driven shaft 131 keyed to inner races 132 of the bearing assembly 126 is free to rotate relative to the arm 118 while a pair of retaining rings 133 preclude axial movement of the inner races 132, and, hence, the driven shaft 131.

The first motor 36 is fixed to the frame 61 and drives the shaft 131 through a clutch brake mechanism (not shown) and a universal joint 141 for rotating the left chuck 37 which is secured to the right end of the driven shaft 131. The left chuck 37 is provided with a first conical, axially-extending recess 142 for gripping and imparting rotation to the resistor core 11 in conjunction with a second similar recess 143 provided in the right chuck 38.

The right chuck 38 is secured to an idler shaft 146 that is mounted for axial sliding movement and rotation in a stepped bore 147 provided in a sleeve 148. The sleeve 148 is keyed to an inner race 149 of a bearing assembly 151 for rotation relative to the arm 118. Retaining rings 152 maintain the bearing assembly 151 at a fixed axial position within the stepped aperture 127 provided in the insulating sleeve 121 that is fixedly mounted in the bore 122.

A housing 156 mounted on the right retaining ring 152 surrounds an end 157 of the sleeve 148 to urge a helical compression spring 158 into a larger section 159 of the stepped aperture 147. The spring 158 is mounted over the idler shaft 146 and is urged into engagement with a retaining ring 161 secured in an annular groove provided in the idler shaft 146. The compression spring 158 biases the idler shaft 146 to the left (as viewed in FIG. 5) for urging the right chuck 38 toward the left chuck 37 to grip the resistor core 11. With the resistor core 11 thus gripped, the first motor 36 is effective to rotate the left chuck 37 which rotates the resistor core 11 and the right chuck 38. The universal joint 141 permits the chucks 37 and 38 to move between the carrier 24 and the cutting wheel 34 while gripping and rotating the resistor core 11.

Grip Controller

The grip controlled 56 (FIG. 5) is effective to slide the idler shaft 146 in the sleeve 148 to operate the right chuck 38 during this movement of the carriage 31. The grip controller 56 includes an inner race 166 of a bearing assembly 167 that is keyed to the idler shaft 146 for rotation therewith and maintained in a fixed axial position thereon by a pair of retaining rings 168. An outer race 171 of the bearing assembly 167 supports an insulating ring 172 that surrounds the inner and outer races 166 and 171 for insulating a chuck operating lever 181 from the right chuck 38. The chuck operating lever 181 is pivotally mounted on the carriage 31 and is urged against an adjustable stop 182 by a leaf spring 183. One end of the lever 181 is provided with bifurcations 184 that straddle the insulating ring 172. Lips 186 (FIG. 1) formed on each of the bifurcations 184 partially surround the insulating ring 172 to reciprocate the idler shaft 146 upon oscillation of the chuck operating lever 181. The stop 182 may be adjusted to limit the amount of oscillatory movement of the lever 181 and thus regulate the axial movement of the idler shaft 146 in the sleeve 148. The amount of gripping movement of the right chuck 38 toward the left chuck 37 may in this manner be adjusted so that various length resistor cores 11 may be gripped between the chucks 37 and 38.

The other end of the chuck operating lever 181 supports a cam follower roller 191 for rotation. The action of the leaf spring 183 on the lever 181 urges the roller 191 into engagement with a flat, elongated cam surface or camway 192 provided on a third slide or plunger 193. The cam surface 192 extends parallel to the direction of movement of the carriage 31 for a sufficient distance to operate the lever 181 as the carriage 31 moves between the loading and machining stations 27 and 33, respectively. In its normal position, the plunger 193 is retracted as shown in solid lines in FIGS. 1, 2, and 5. In this position, the roller 191, assisted by the leaf spring 183 and the compression spring 158 engages the cam surface 192 to position the chuck operating lever 181 so that the left and right chucks 37 and 38 grip a resistor core 11.

In its operated position, the plunger 193 is advanced to the left as shown in dashed lines in FIGS. 2 and 5. The cam surface 192 urges the roller 191 to the left to rotate the lever 181 clockwise. Clockwise rotation of the lever 181 moves the idler shaft 146 axially to the right in the sleeve 148 into an open position to open the chucks 37 and 38 and release the gripped resistor core 11.

The plunger 193 is mounted in a bore 194 formed horizontally through a support block 196 that is mounted on the frame 61. The plunger 193 slides in the bore 194 in a second direction that is perpendicular to the path of advancement of the carriage 31 between the stations 27 and 33. A connecting rod 198 threaded into the plunger 193 extends through a vertical slot 199 formed in the block 196. A bifurcated end 201 of a bell crank 202 straddles the upper end of the connecting rod 198 for reciprocating the rod and the plunger 193 in the second direction.

A post 211 mounted to the frame 61 adjacent the block 196 is adapted to secure one end 212 of a tension spring 213 that is connected to the rod 198 for urging the plunger 193 into the normal position to close the chucks 37 and 38. In the normal position, a right end 214 of the plunger 193 actuates a contact arm 216 of the air valve 96 that is secured to a mounting bracket (see FIG. 5). When actuated, the air valve 96 connects the reservoir 98 to the air cylinder assembly 93 (FIGS. 1 and 3) which actuates the gate 84 for dispensing a resistor core 11 into the conveyor tube 92.

The other end of the bell crank 202 is provided with a second cam follower roller 221 (FIGS. 1 and 2) which rides on a face cam 222. The face cam 222 is formed on a cam member 223 provided in the unitary cam drive 32. The tension spring 213 urges the bell crank 202 counterclockwise so that the second cam follower roller 221 is maintained in engagement with the face cam 222. Upon rotation of the unitary cam drive 32, the bell crank 202 is oscillated for sliding the plunger 193 in the bore 194 to actuate the chuck operating lever 181 as the carriage 31 moves between the loading and machining stations 27 and 33, respectively.

Carriage

Referring to FIGS. 4 and 5, the carriage 31 that supports the chucking mechanism 28 is shown provided with a downwardly projecting lug 231. The lug 231 projects through a slot 232 formed in the frame 61 and is received in an annular member 233 mounted on the end of one arm 234 of a carriage lever 236. The carriage lever 236 is mounted on the frame 61 for oscillation on a pivot pin 237 under the action of a cylindrical roller or carriage cam follower 238 secured to a second lever arm 239. The carriage cam follower 238 is loosely received in and rides in a cam slot 241 (FIG. 1) provided in the cam member 223 of the unitary cam drive 32.

The cam member 223 is rotated by the second cam shaft 78 so that an outer wall 242 of the cam slot 241 acts on and moves the carriage cam follower 238 in a first or generally upward direction (as viewed in FIG. 1) to rotate the carriage lever 236 counterclockwise on the pivot pin 237. The carriage lever 236 advances the lug 231 and, hence, the carriage 31, from the loading station 27 toward the machining station 33.

The cam slot 241 is so designed that the outer wall 242 moves the carriage cam follower 238 in the first direction until the carriage 31 positions the rotating resistor core in contact with the cutting wheel 34 (see FIGS. 6 and 7).

As the resistor core 11 contacts the cutting wheel 34, the magnetic field of the electromagnetic device 51 is coupled with the carriage 31 and is effective to move the carriage 31 an additional distance toward the cutting wheel 34. During this additional advancement of the carriage, the rotating resistor core 11 is pressed against the cutting wheel 34 until the cutting wheel cuts a desired distance through the carbon coating 12.

To permit the carriage cam follower 238 to be loosely received in the cam slot 241, an inner wall 251 (FIGS. 1 and 2) of the cam slot 241 is spaced from the outer wall 242 by a distance that exceeds the diameter of the carriage cam follower 238. The cam follower 238 is thus permitted to advance across the cam slot 241 when the electromagnet device 51 further advances the carriage 31 toward the cutting wheel 34 at the start of a helixing operation. After the helixing operation has been completed and the resistor core released from engagement with the cutting wheel 34, the inner wall 251 advances the carriage cam follower 238 clockwise with respect to the pin 237 to move the carriage 31 along the guide rods 117 toward the loading station 27.

Electromagnetic Device

A coil 259 of an electromagnet 261 included in the electromagnetic device 51 is connected across a battery 262 and a variable resistor 263 as shown in FIG. 4. By varying the resistance of the resistor 263, the field strength of the coil 259 may be controlled so that the carriage 31 is urged through the additional distance toward the cutting wheel 34 by a desired force. The pressure of the rotating resistor core 11 against the cutting wheel 34 may thus be selected to regulate the depth to which the spiral groove 16 is cut in the carbon coating 12. In practice, the depth of the groove 16 is selected to exceed the thickness of the carbon coating 12 to insure complete physical and electrical separation of the turns of the helical circuit path 14.

Machining Station

As the carriage 31 advances the rotating resistor core 11 toward the cutting wheel 34, the cutting wheel commences traversing in a direction that is parallel to the axis of rotation of the rotating resistor core 11. As shown in FIG. 4, the cutting wheel 34 is mounted for rotation on the second slide 42. The second motor 41 is also mounted on the slide 42 for rotating the cutting wheel 34 at a selected speed. A cam follower 271 (shown in FIG. 1) is secured to the second slide 42 for engagement with a cam 272 that is keyed to the first cam shaft 77. As the gear train 67 rotates the first cam shaft 77 and the cam 272, the cam follower 271 advances the second slide 42 along spaced guides 274 (FIG. 4) to traverse the cutting wheel 34 in a reciprocatory path that is parallel to the axis of rotation of the rotating resistor core 11.

As the carriage 31 advances the rotating resistor core 11 toward the machining station 33, the cam follower 271 rides along a low point 276 of the cam 272 to render a compression spring 277 effective to advance the cutting wheel slide 42 to the right as shown in FIGS. 1 and 6. The line 43 on the resistor core and the edge 44 of the cutting wheel 34 move relative to each other along the 45° line 46, whereupon the electromagnetic device 51 is effective to press the resistor core 11 into engagement with the cutting wheel 34 as shown in FIG. 7. The cutting wheel 34 traverses and cuts the spiral groove 16 in the coating 12 as the slide 42 continues to advance under the action of the compression spring 277 and the cam follower 271. The control circuit 52 is effective as the cutting wheel 34 traverses to monitor the resistance of the helical circuit path 14 formed as the spiral groove 16 is cut.

Control Circuit

The control circuit 52 (FIG. 1) is shown connected electrically to the rotating resistor core 11 by conductors 281 secured to brushes 282 that engage the shafts 131 and 146. The conductors 281, the brushes 282, the shafts 131 and 146, and the resistor core 11 form a first branch 284 of a Wheatstone bridge 286 having fixed resistors 288 and 289 in two other branches thereof. It may be appreciated that the resistor core 11 forms a variable resistance in the first branch 284. The bridge 286 is also provided with a binary decade resistor 287 in a fourth branch thereof which may be adjusted manually or by an automatic control mechanism such as a computer (not shown). A battery 291 is connected across terminals 292 and 293 of a center branch 285 of the bridge 286 in a conventional matter.

Connected to an output terminal 294 of the bridge 286 by a conductor 296 is a D.C. amplifier 297 which applies a control potential to an electrode 299 of a switch such as a PNPN solid state switch 298. A second output terminal 295 is connected to a resistor 300 and a parallel combination of a Zener diode 301 and a resistor 302 which is connected to an output terminal 303 of the amplifier 297 to limit the output of the amplifier and thus prevent saturation and resulting sluggish operation of the amplifier 297.

The switch 298 is provided with an anode 304 connected to a solenoid energization circuit including the release solenoid 53, a normally closed contact 305 of a reset switch 326, and a D.C. voltage source 306. When the switch 298 is rendered conductive, the solenoid energization circuit is completed from the D.C. source 306 through the normally closed contact 305, through the release solenoid 53, through the anode 304, and through a cathode 307 of the switch 298 to ground for energizing the release solenoid 53.

In the operation of the control circuit 52, the unhelixed resistor core 11 in the first branch 284 of the Wheatstone bridge 286 causes a bridge unbalance which exists until the resistance value of the resistor core 11 equals the resistance value of the binary decade resistor 287. This bridge unbalance causes a voltage across the center branch 285 which is amplified by the D.C. amplifier 297. The amplifier 297 applies a negative control signal to the electrode 299 of the PNPN switch 298 to maintain the switch in an "OFF" condition. When the bridge 286 balances, i.e., when the resistance value of the resistor core 11 equals the resistance of the binary decade resistor 287, a control signal of zero potential is applied to the electrode 299.

When the spiral groove 16 has been cut so as to form the helical circuit path 14 having a resistance value equal to a desired value—which desired value may be 0.1 percent greater than the resistance value to which the binary decade resistance 287 is adjusted—a bridge unbalance of a reverse polarity is applied from the terminal 294 to the amplifier 297. The amplifier 297 applies a positive control signal to the electrode 299 in response to the reverse polarity bridge unbalance. The positive control signal renders the switch 298 conductive, thereby completing the solenoid energization circuit for energizing the release solenoid 53.

Referring to FIG. 4, the release solenoid 53 is shown provided with the hooked arm 54. When energized, the release solenoid 53 advances the hooked arm 54 to the right so that a hooked section 311 of the arm 54 engages a latch member 312 secured to the base 116 of the carriage 31. The hooked section 311 pulls the latch member 312 and thus the carriage 31 away from the machining station 33 with a force that overcomes the force of the electromagnet device 51 to withdraw the resistor core 11 from cutting engagement with the cutting wheel 34 immediately upon attainment of the desired resistance value.

The inner wall 251 of the cam slot 241 is then effective to operate the carriage lever 236 and advance the carriage toward the loading station 27. During this advancement, a cam 320 is positioned by a shaft 321 rotated by the gear 71, for actuating an arm 322 (FIG. 1) of the reset switch 326. The arm 322 opens the contact 305 which opens the solenoid energization circuit. The release solenoid 53 is thus deenergized and returns the hooked arm 54 to its original retracted position.

*Operation*

In the operation of the machining apparatus, the main drive motor 62 is energized for actuating the gear train 67. Also, the motors 41 and 36 are energized for rotating the cutting wheel 34 and the left chuck 37, respectively. Then, a supply of coated resistor cores 11 is provided in the supply tube 22. The plunger 193 of the grip controller 56 is advanced to the right by the bell crank 202 to operate the chucks 37 and 38 for gripping a resistor core 11 from the carrier 24. When the chucks 37 and 38 grip the resistor core, the end 214 of the plunger 193 engages the contact arm 216 of the air valve 96 which actuates the air cylinder assembly 93 for operating the gating mechanism 21. The gating mechanism 21 dispenses a coated resistor core 11 from the supply tube 22 into the conveyor tube 92 whereupon the core 11 is advanced by the pneumatic feeder 91 through the conveyor tube 92.

The gear train 67 rotates the driver shaft 79 in timed sequence with the operation of the gating mechanism 21 so that the carrier 24 is rotated thereby to position a notch 23 in alignment with the conveyor tube 92 for receiving the dispensed resistor core 11. The carrier 24 rotates further and advances the resistor core 11 to the loading station 27. At this time, the gear train 67 has rotated the second cam shaft 78 to position the cam member 223 of the unitary cam drive 32 so that the carriage 31 is fully advanced to the loading station 27 for positioning the chucks 37 and 38 in straddling relationship with the dispensed resistor core 11 that is received in the advancing notch 23. As the carriage 31 advances to the loading station 27, the cam follower roller 191 rides along the flat cam surface 192 of the plunger 193 of the grip controller 56.

Just as the dispensed resistor core 11 advances between the chucks 37 and 38, the face cam 222 of the unitary cam drive 32 actuates the bell crank 202 for sliding the plunger 193 in the second direction away from the carriage 31. The cam follower roller 191 is maintained in engagement with the cam surface 192 by the leaf spring 183 and thus moves in the second direction so that the chuck operating lever 181 is rotated counterclockwise. The lever 181 advances the right chuck 38 toward both the resistor core 11 and the left chuck 37 whereupon the resistor core 11 is gripped and received in the conical recesses 142 and 143 in the chucks 37 and 38.

The chucks 37 and 38 interrupt the advancement of the resistor core 11 so that the notch 23 moves out from under the resistor core 11. The interrupted resistor core 11 pivots the clamp lever 106 on the pivot pin 107 whereupon the outer wall 242 of the cam slot 241 of the unitary cam drive 32 causes the carriage lever 236 to advance the carriage 31 toward the machining station 33. The chucks 37 and 38 and the gripped resistor core 11 advance with the carriage 31 so that the resistor core is removed from the carrier slot 102. The face cam 222 and the cam slot 241 of the unitary cam drive 32 actuate the bell crank 202 and the carriage lever 236, respectively, to maintain the resistor core 11 gripped and further advance the carriage 31 toward the machining station 33. At this time the gear train 67 rotates the first cam shaft 77 to position the cam 272 so that the cutting wheel slide 42 commences traversing to the right as viewed in FIG. 1.

The outer wall 242 of the cam slot 241 ceases to advance the carriage 31 toward the machining station 33 when the rotating resistor core 11 engages the cutting wheel 34. The magnetic field of the electromagnetic device 51, the strength of which has been selected by adjusting the resistor 263 to produce a desired depth of cut, is then effective to further advance the carriage 31 toward the machining station 33 to press the rotating resistor core 11 into cutting engagement with the traversing cutting wheel 34 and effect the desired depth of cut. The carriage cam follower 238 advances across the cam slot 241 out of engagement with the outer cam wall 242 to permit this further advancement of the carriage 31.

The control circuit 52 monitors the resistance value across the terminals 13 of the resistor core 11 as the spiral groove 16 is cut to form the helical circuit path 14. When the resistance value equals a desired value, the bridge 286 of the control circuit renders the amplifier 297 effective to apply a positive signal to the PNPN switch 298. The positive signal renders the PNPN switch 298 conductive whereupon the release solenoid 53 is energized for advancing the hooked arm 54 to the right. The hooked arm 54 engages the latch 312 and moves the carriage 31 against and overcomes the magnetic field of the electromagnetic device 51. The carriage 31 moves toward the loading station 27 and moves the grooved resistor 10 out of cutting engagement with the cutting wheel 34 so that the helical circuit path 14 has a resistance value equal to the desired value. The cam 320 opens the contact 305 of the reset switch 326 to restore the solenoid 53 to its original condition. The cutting wheel cam 272 then restores the slide 42 to the initial position in anticipation of another cutting cycle.

The inner wall 251 of the cam slot 241 acts on the carriage cam follower 238 as the slide 42 is restored to the initial position, to rotate the carirage lever 236 and advance the carriage 31 toward the loading station 27 to position the chucks 37 and 38 over the discharge chute 57. The cam follower roller 191 rides along the flat cam surface 192 of the plunger 193 as the carriage advances. When the chucks 37 and 38 are directly over the discharge chute 57, the face cam 222 actuates the bell crank 202 which slides the plunger 193 to the left (as viewed in FIG. 1). The plunger 193 actuates the chuck operating lever 181 to open the chucks 37 and 38 and release the grooved resistor 10. The released resistor 10 drops into the discharge chute 57 for advancement to a subsequent fabricating machine (not shown).

The cam slot 241 and the face cam 222 of the unitary cam drive 32 are then effective to advance the carriage 31 to the loading station 27 and maintain the chucks 37 and 38 open, respectively, in condition for another cycle of operation. During the next cycle of operation, the chucks 37 and 38 grip another resistor core 11. At this time, the cam 320 actuates the arm 322 of the reset switch 326 to close the contact 305 and condition the PNPN switch for operation. The contact 305 is closed after another resistor core 11 is gripped by the chucks 37 and 38 to permit operation of the PNPN switch 298 and the release solenoid 53 only when a resistor core 11 is received in the chucks 37 and 38.

It is to be understood that the above-described arrangement are simply illustrative of the application of the principles of this invention. Numerous other arrangements may be readily devised by those skilled in the art which will embody the principles of the invention and fall within the spirit and scope thereof.

What is claimed is:

1. In a device for selectively removing portions of a coating provided on an article,
   a rotating cutting wheel,
   driven chucking means for rotating said article,
   slide means for moving the chucking means toward the cutting wheel to position the rotating article in cutting engagement with the wheel, connecting means for advancing the slide means to effect said cutting engagement, said connecting means provided with a cam follower having a predetermined dimension, electromagnetic means having a magnetic field coupled with the slide means upon effectuation of said cutting engagement for selectively moving the slide means to regulate the cutting depth of said wheel in said coating, cams means having a continuous cam slot for receiving the cam follower, said cam slot provided with a first wall for moving the cam follower in a first direction to operate the connecting means and effect said advancing of the slide means, said cam slot provided with a second wall spaced from said first wall by a distance exceeding said predetermined dimension for permitting said cam follower to move in the first direction across the cam slot out of contact with the first wall upon said selective moving of the slide means, and means for traversing the cutting wheel in the direction of the axis of said rotating article to cut a spiral groove in said coating.

2. In a device for fabricating coated articles, a rotating fabricating tool, a carrier having a notch for receiving a coated article and a lip for retaining said article in the notch, an arm pivotally mounted on the carrier for releasably holding the article in the notch, a pair of driven chucks for gripping and rotating an article received in said notch, a carriage for supporting the chucks, cam follower means connected to said carriage for moving the carriage to position the chucks to grip and rotate the article, power means for continuously advancing the carrier to move the notch and the lip out of retaining engagement with the article gripped by the chucks, cam means operated by the power means in timed relation with the advancement of the carrier for operating the chucks to grip said article and release the arm upon movement of the lip out of said retaining engagement, a cam drive having a cam slot in loose engagement with said cam follower means, said cam drive operated by the power means for actuating the cam follower means to forcibly move the carriage and the gripped article toward said fabricating tool while said cam slot permits a limited range of movement of the cam follower means and said carriage relative to said fabricating tool, and electromagnetic means having a variable magnetic field coupled to said carriage for selectively advancing the carriage within said limited range of movement to urge the gripped article into selective cutting engagement with the rotating fabricating tool.

References Cited in the file of this patent
UNITED STATES PATENTS

| | | |
|---|---|---|
| 2,356,226 | Delehan et al. | Aug. 22, 1944 |
| 2,405,485 | Barkstrom et al. | Aug. 6, 1946 |
| 2,406,562 | Reynolds | Aug. 27, 1946 |
| 2,418,804 | Hood | Apr. 8, 1947 |
| 2,669,811 | Henderson | Feb. 23, 1954 |
| 2,749,808 | Burgsmuller | June 12, 1956 |
| 2,871,765 | Saari | Feb. 3, 1959 |
| 2,884,746 | Rus et al. | May 5, 1959 |
| 3,012,383 | Layer et al. | Dec. 12, 1961 |